United States Patent [19]
Igari et al.

[11] Patent Number: 5,894,915
[45] Date of Patent: Apr. 20, 1999

[54] ONE WAY CLUTCH

[75] Inventors: Kouzaburou Igari; Yoshio Kinoshita; Yasuhide Takasu, all of Shizuoka, Japan

[73] Assignee: NSK-Warner Kabushiki Kaisha, Tokyo, Japan

[21] Appl. No.: 08/848,657

[22] Filed: Apr. 29, 1997

[30] Foreign Application Priority Data

Apr. 30, 1996 [JP] Japan .................. 8-130621

[51] Int. Cl.$^6$ ............................... F16D 41/07
[52] U.S. Cl. ............. 192/45.1; 192/41 A; 188/82.8
[58] Field of Search ............... 192/45.1, 41 A; 188/82.8

[56] References Cited

U.S. PATENT DOCUMENTS

| | | | |
|---|---|---|---|
| 2,998,875 | 9/1961 | Zlotek | 192/45.1 |
| 3,937,310 | 2/1976 | Oldfield | 192/41 A |
| 4,960,189 | 10/1990 | Ogata et al. | 192/41 A |
| 5,000,303 | 3/1991 | Shoji et al. | 192/45.1 |
| 5,758,755 | 6/1998 | Igari | 192/45.1 |

FOREIGN PATENT DOCUMENTS 792839  4/1958  United Kingdom ......... 192/45.1

*Primary Examiner*—Richard M. Lorence
*Attorney, Agent, or Firm*—Sughrue, Mion, Zinn, Macpeak & Seas, PLLC

[57] ABSTRACT

A one way clutch has a retainer for receiving a sprag intervening between an outer ring and an inner ring. The retainer includes a cylindrical structural body; a stepped flange which radially protrudes from one end of the structural body so that it communicates with a spot facing hole and inner periphery of the outer ring; a sprag receiving groove formed to be cut toward the flange for receiving the sprag; and an elasticity imparting groove formed to an axial direction of the structural body. The flange prevents reduction in the strength of the retainer due to the provision of the sprag receiving groove in the retainer and hence prevents damage of the retainer such as cracking. A remaining portion located at the position corresponding to the elasticity imparting groove imparts elasticity to the retainer.

24 Claims, 14 Drawing Sheets

1
ONE WAY CLUTCH

BACKGROUND OF THE INVENTION

1. Field of the Invention

The present invention relates to a one way clutch which is incorporated between a driving shaft and a driven shaft of e.g. motor vehicle, general industrial machine, etc., and has a function of transferring only power in a one way rotation of the driving shaft to the driven shaft.

2. Description of the Related Art

Conventionally, a one way clutch is provided with a retainer for receiving a sprag intervening between an outer ring and an inner ring. The sprag is pushed by a ring-shaped spring from outside toward inside in a radial direction of the retainer so that it is held by the retainer.

An example of the retainer is a retainer 30 as shown in FIG. 27.

The retainer 30 has a plurality of sprag receiving grooves 32 cut in an axial direction from the one end of an cylindrical structural body 31. Sprags (not shown) are mounted in the respective sprag receiving grooves 32.

The one way clutch is required to shorten its axial length for the purpose of miniaturizing. Therefore, the wall thickness (T1) of a remaining portion 33 formed by the sprag receiving grooves 32 of the retainer 30 must be reduced.

However, the one way clutch provided with the retainer with the remaining portion having a reduced wall thickness has the following defects.

(1) Since the wall thickness of the remaining portion is small, the strength of the retainer is lowered. Therefore, while the retainer is used for a long time, the remaining potion will suffer from damage such as crack. Thus, the retainer is likely to be not able to effect smooth operation.

(2) When the sprag slips owing to excess load, it vigorously hits on the retainer. Therefore, while the retainer is used for a long time, the remaining portion will suffer from damage. Thus, the retainer is likely to be not able to effect a smooth operation.

(3) If the wall thickness of the remaining portion is increased so that the remaining portion does not suffer from damage, the elasticity of the retainer is reduced and its size will be increased, thereby making it impossible to miniaturize the one way clutch.

SUMMARY OF THE INVENTION

It is an object of the present invention to provide a one way clutch capable of effecting a smooth operation for a long time without impairing the clutch function.

In the present invention, the one way clutch having a retainer for receiving a sprag intervening between an outer ring having a spot facing hole and an inner ring, comprises a cylindrical structural body; a flange radially protruding from one end of said structural body, and having a stepped distal end for forming a first flange end face and a second flange end face, wherein said first flange end face abuts an inner periphery of said spot facing hole and said second flange end face abuts an inner periphery of said outer ring; a sprag receiving groove formed toward said flange for receiving said sprag; and an elasticity imparting groove formed in an axial direction of said structural body.

The flange is formed at the position corresponding to the conventional remaining portion.

The flange is formed in a radial shape so that it can have a larger diameter than that of the conventional remaining portion. With the strength of the flange being made equal to that of the conventional remaining portion, the thickness of the flange can be made smaller than the wall thickness of the remaining portion of the conventional retainer. Correspondingly, the length of the retainer according to the present invention can be reduced by a difference between the thickness of the flange and the wall thickness of the remaining portion of the conventional retainer.

What imparts elasticity to the retainer is a remaining portion at the position corresponding to the elasticity imparting groove. The wall thickness of the remaining portion can be freely set by changing the size of the elasticity imparting groove. The number of remaining portions corresponding to that of the elasticity imparting grooves are provided.

The elasticity of the retainer is set by the size and number of the elasticity imparting groove.

Even when the sprag slips because of excess load and the resultant shock is given to the retainer, the entire retainer according to the present warps and hence is difficult to crack.

Thus, the one way clutch according to the present invention can effect a smooth operation for a long time without impairing the clutch function.

BRIEF DESCRIPTION OF THE INVENTION

Figure 8:
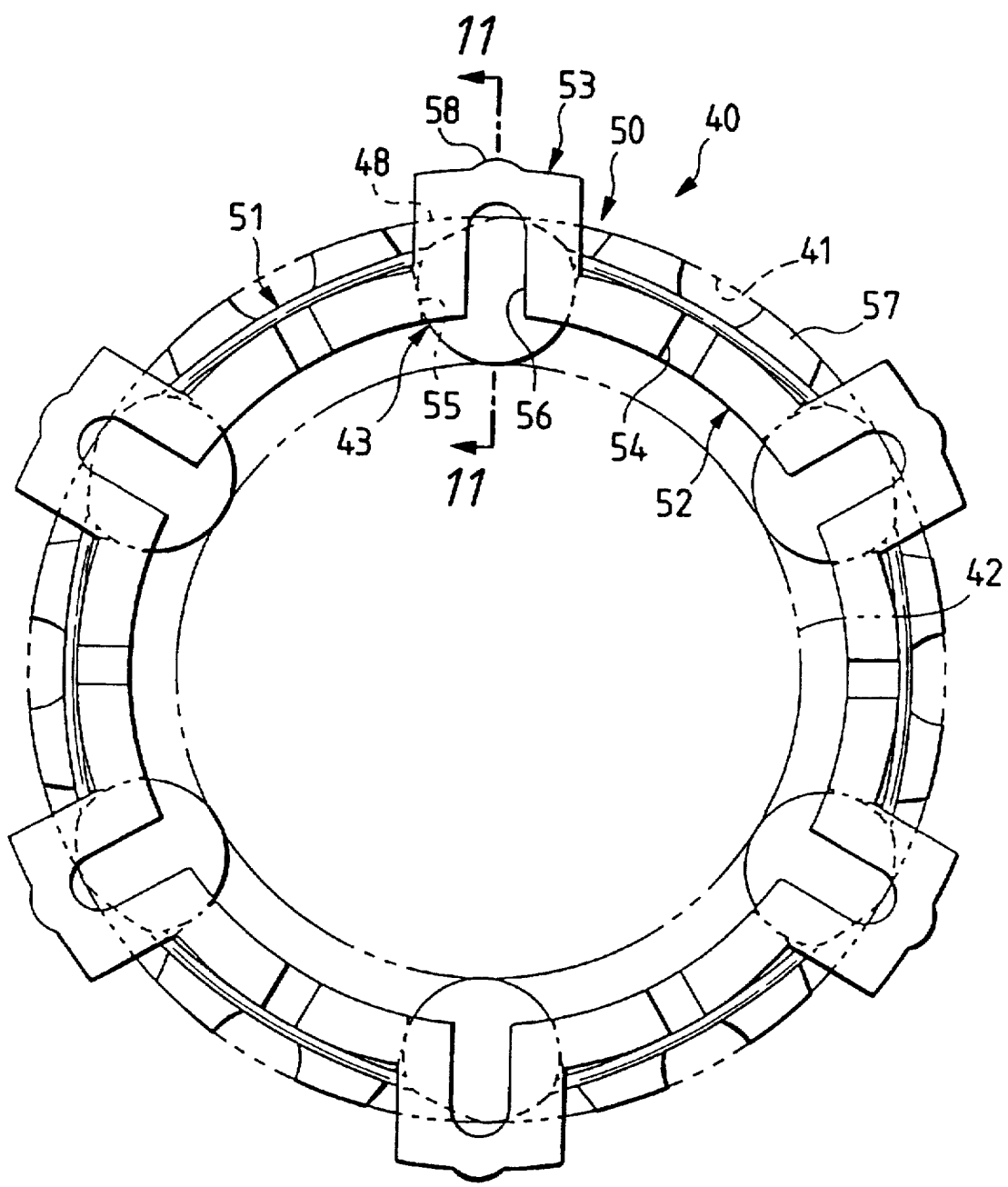
FIG. 8 is a front view showing the state where a retainer of FIG. 1 with a sprag and spring mounted is incorporated.
Figure 9:
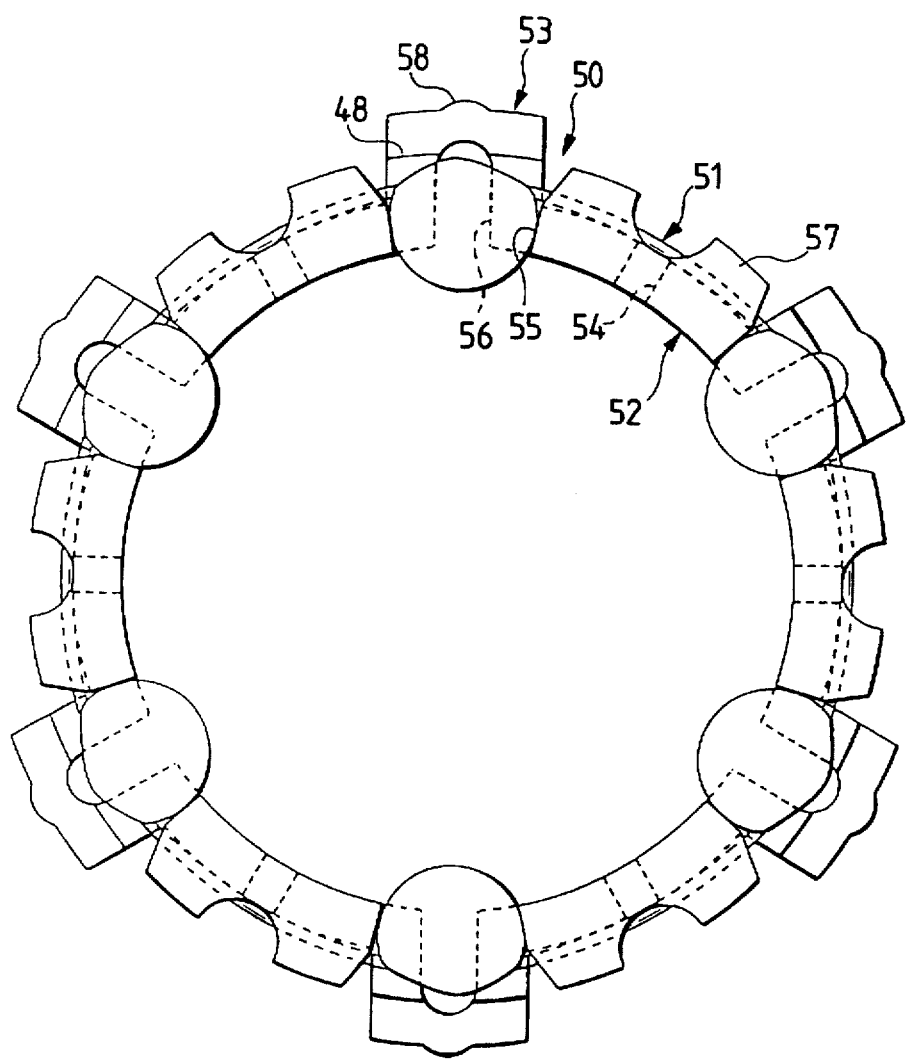
Figure 10:
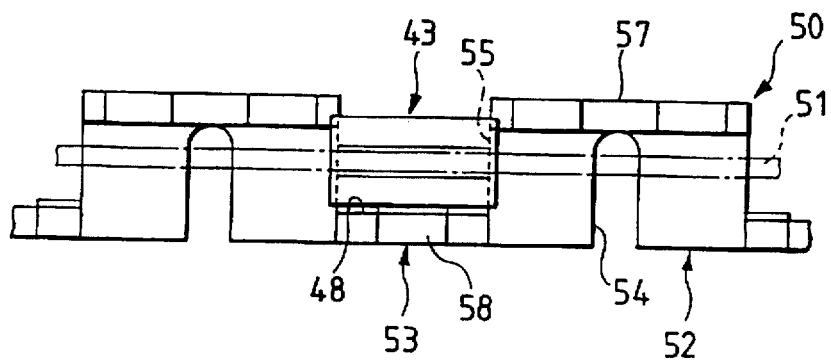
Figure 11:
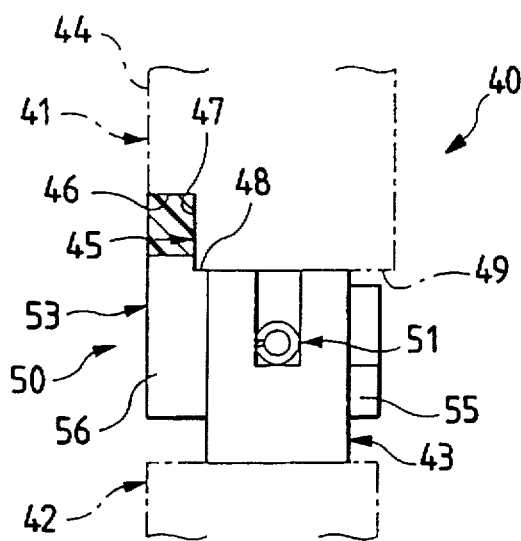
Figure 12:
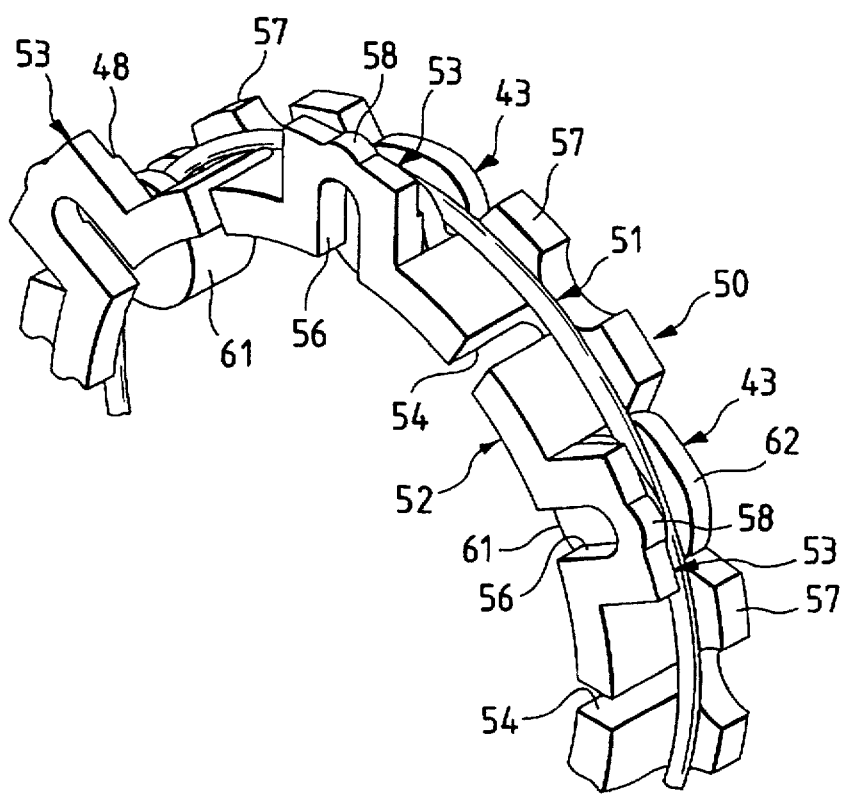
Figure 13:
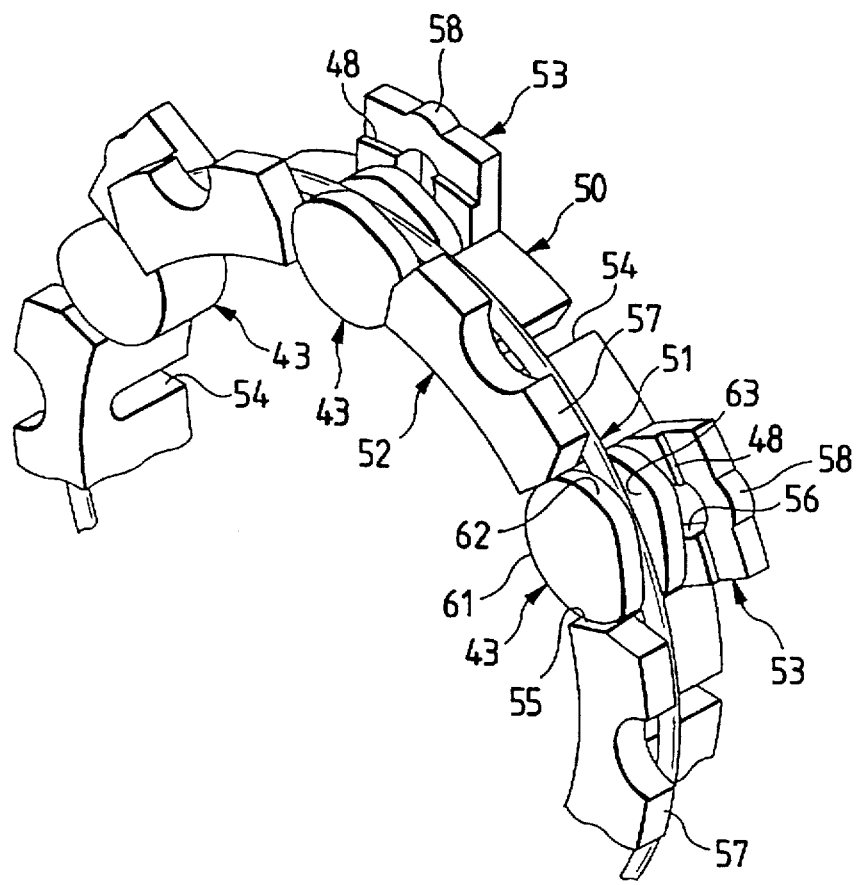
Figure 14:
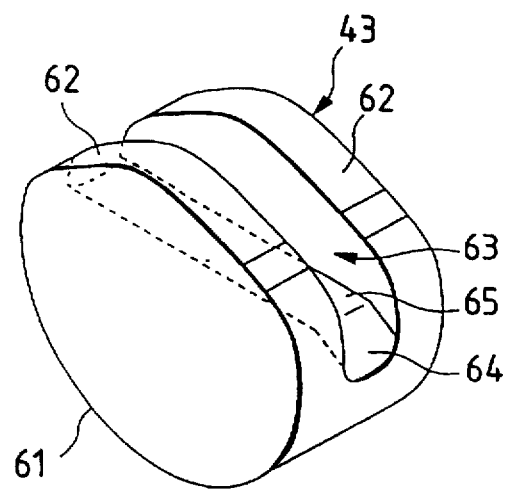
Figure 15:
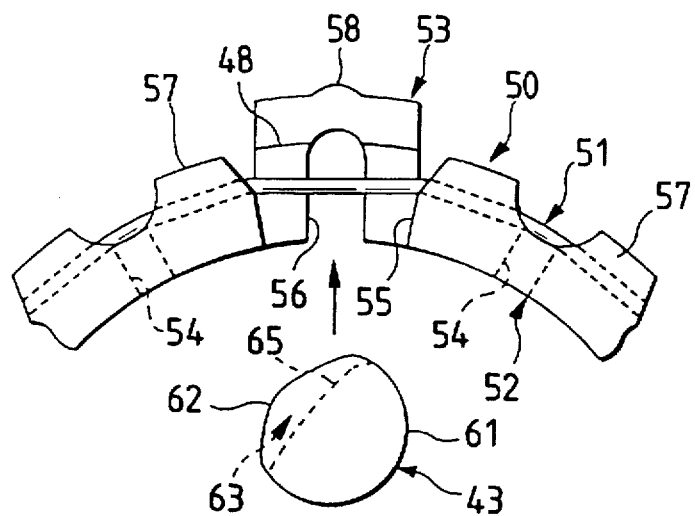
Figure 16:
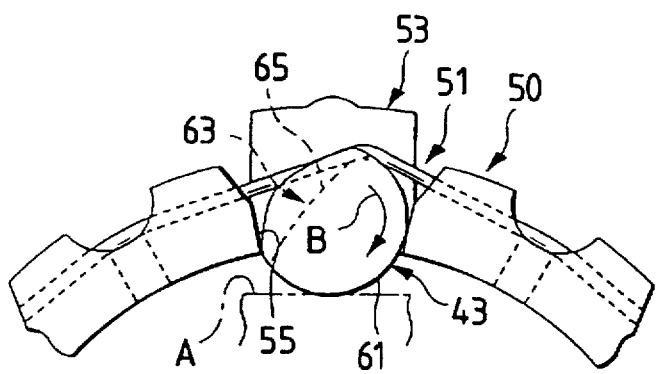
Figure 17:
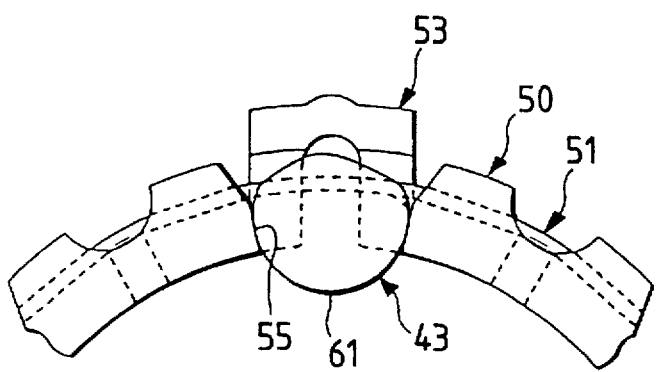
Figure 18:
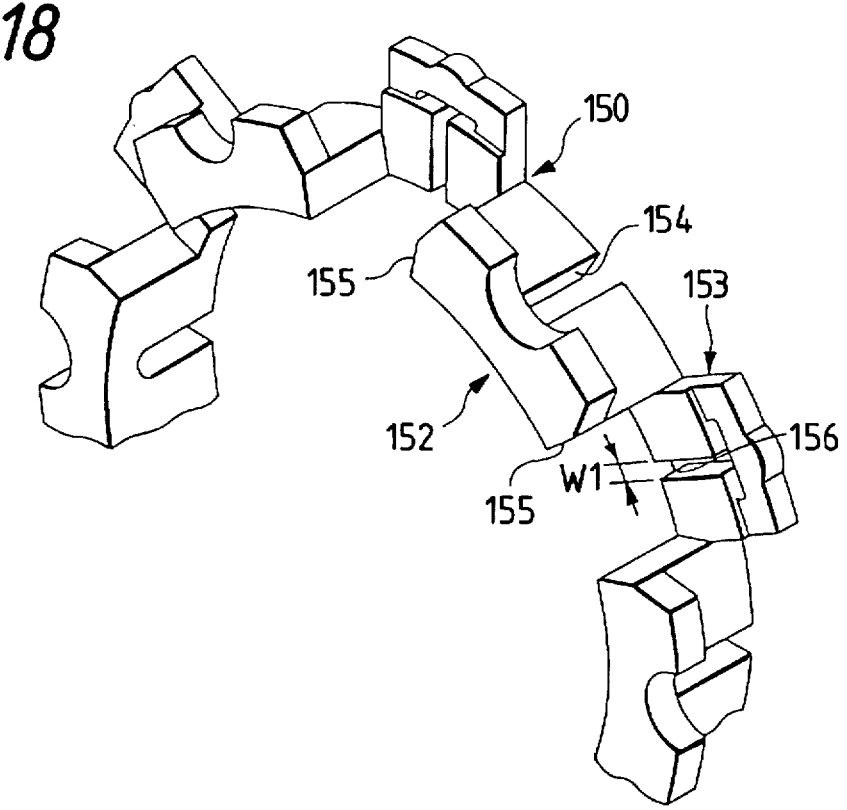
Figure 19:
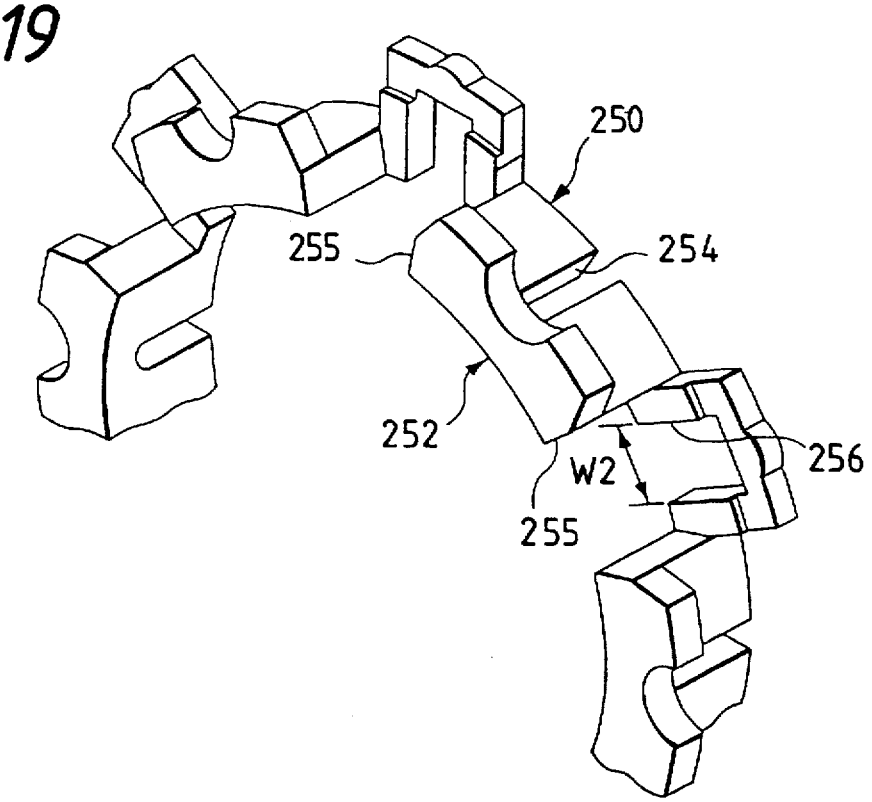
Figure 20:
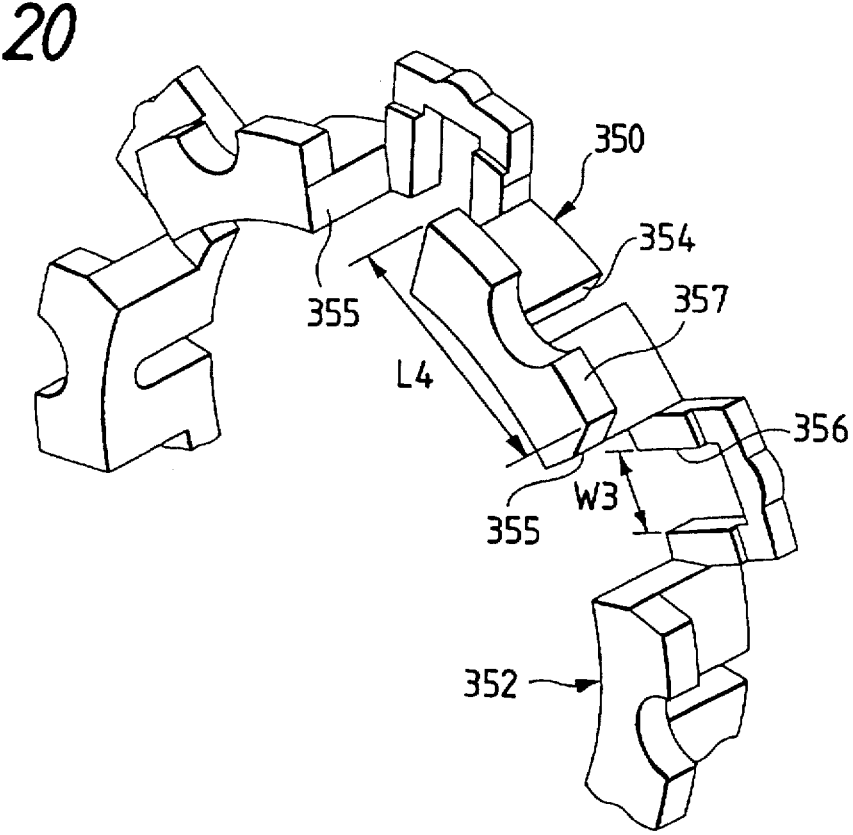
Figure 21:
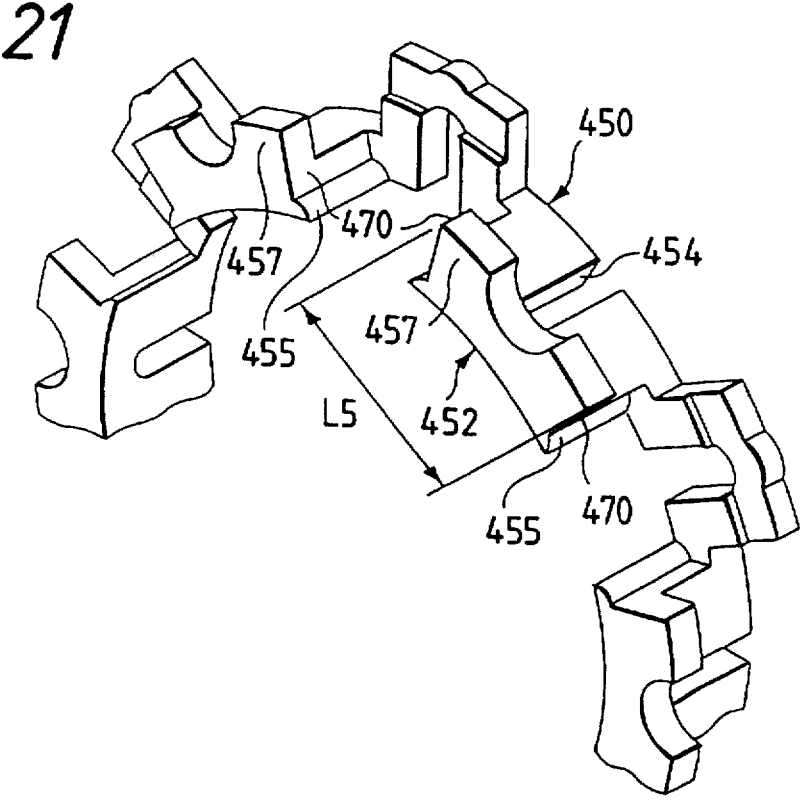
Figure 22:
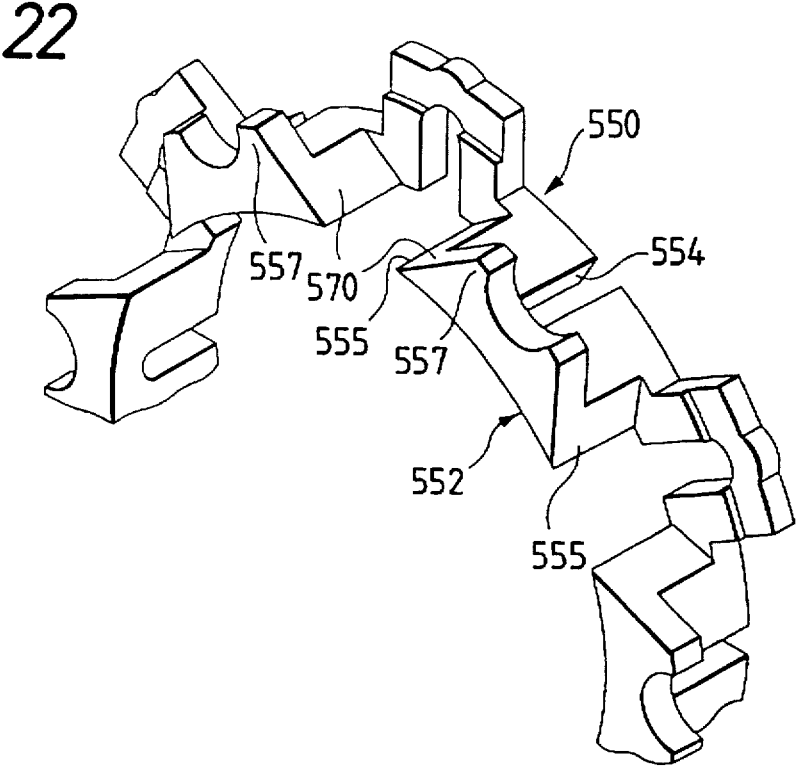
Figure 23:
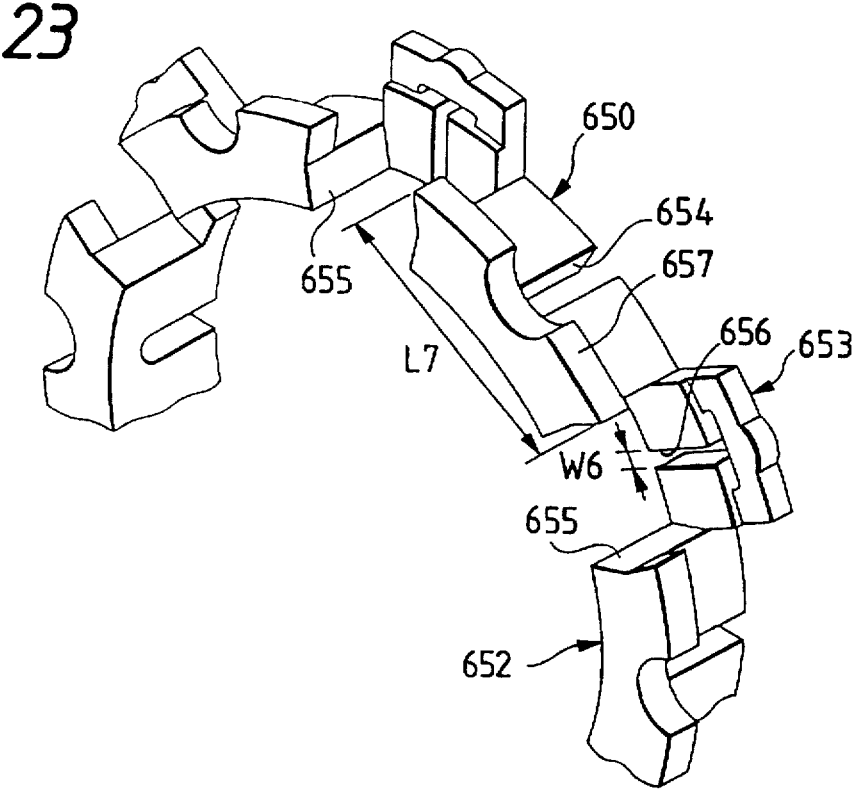
Figure 24:
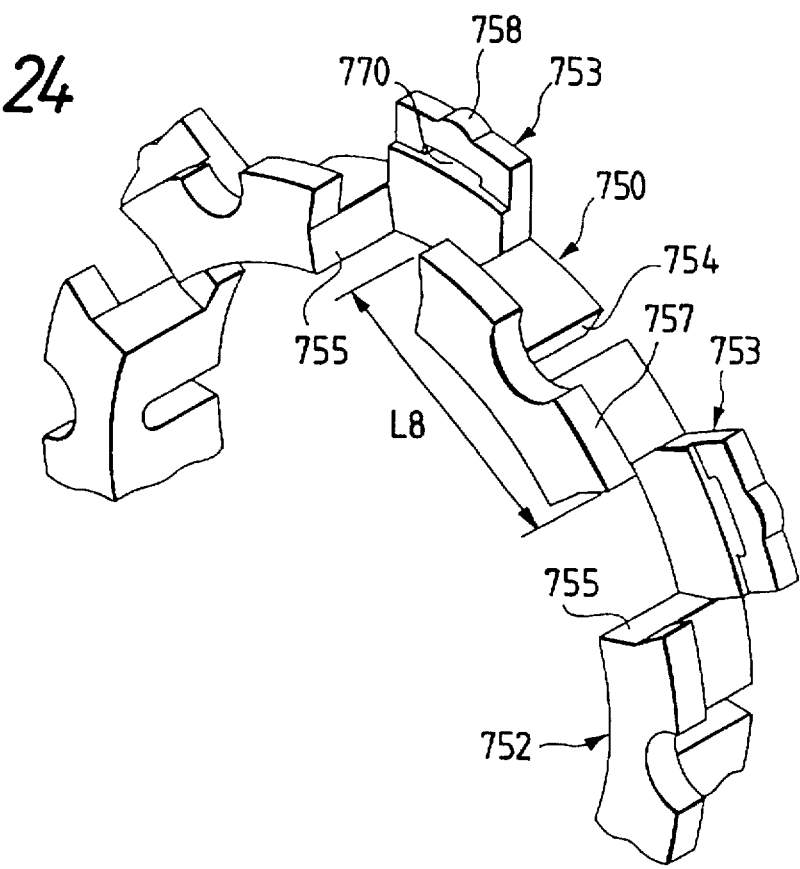
Figure 25:
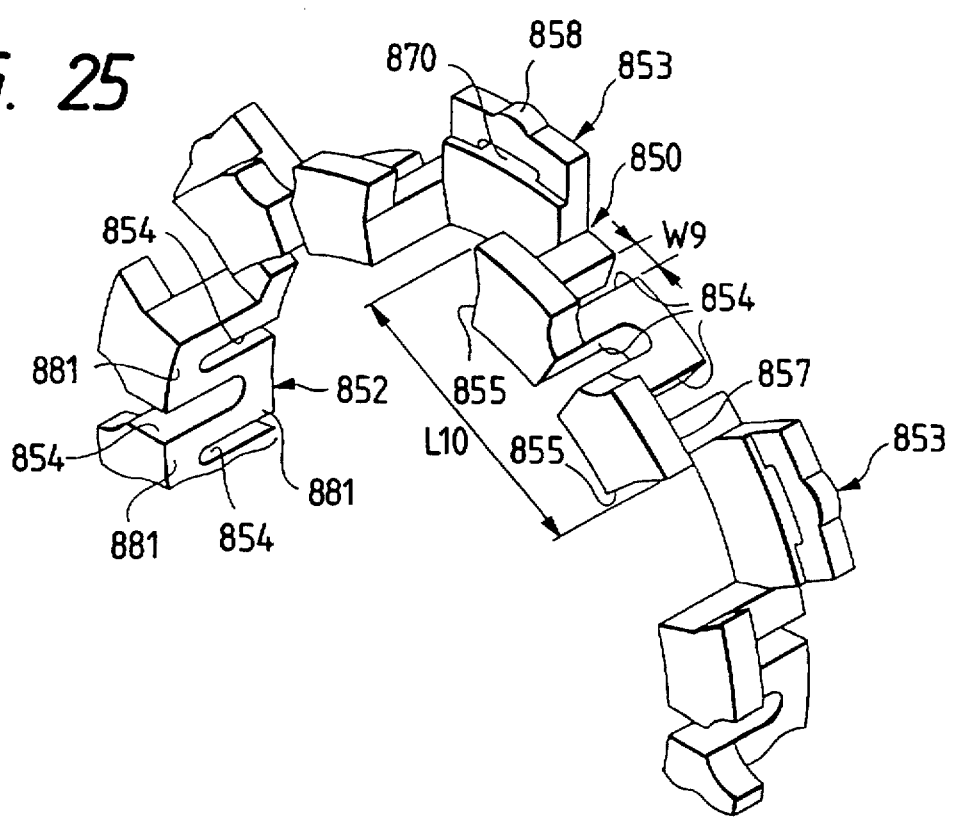
Figure 26:
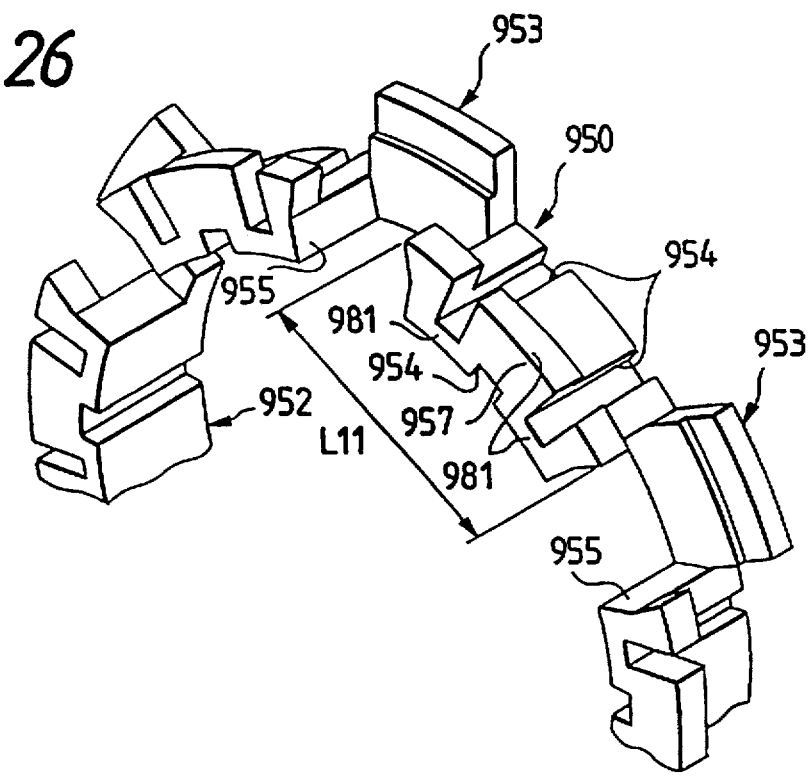
Figure 27:
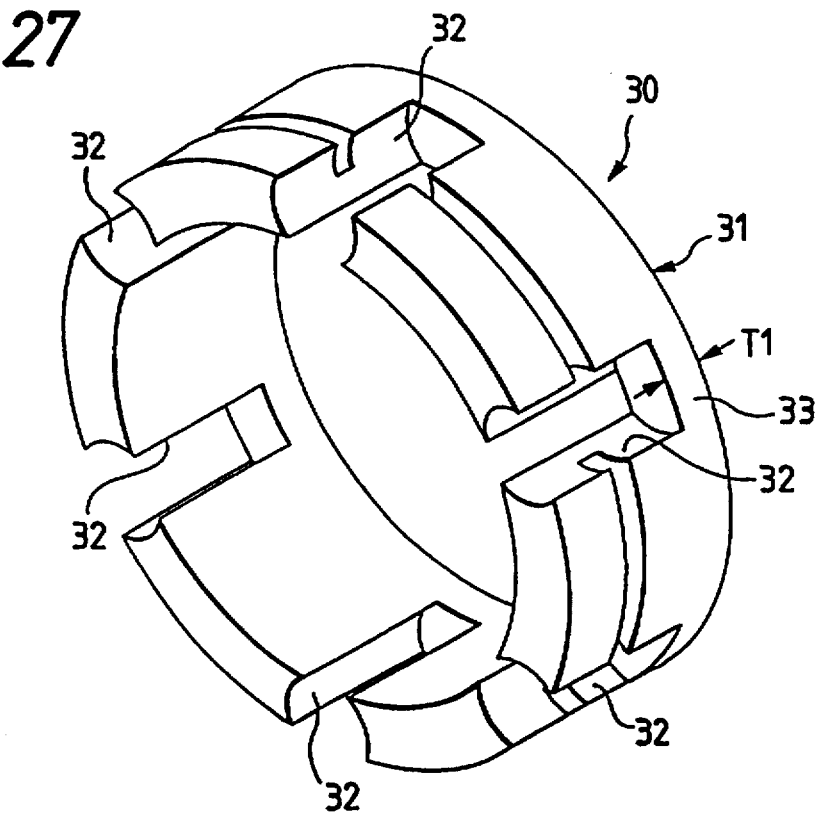

FIG. 9 a rear view of FIG. 8;

FIG. 10 is a plan view of FIG. 8;

FIG. 11 is a sectional view taken on line 11—11 of FIG. 8;

FIG. 12 is a perspective view of FIG. 8;

FIG. 13 is a perspective view of FIG. 9;

FIG. 14 is a perspective view of a sprag;

FIG. 15 is a view for explaining incorporation of the sprag into the retainer;

FIG. 16 is a view for explaining incorporation of the sprag into the retainer;

FIG. 17 is a view for explaining incorporation of the sprag into the retainer;

FIG. 18 is a perspective view of the retainer according another embodiment of the present invention;

FIG. 19 is a perspective view of the retainer according still another embodiment of the present invention;

FIG. 20 is a perspective view of the retainer according a further embodiment of the present invention;

FIG. 21 is a perspective view of the retainer according a further embodiment of the present invention;

FIG. 22 is a perspective view of the retainer according a further embodiment of the present invention;

FIG. 23 is a perspective view of the retainer according a further embodiment of the present invention;

FIG. 24 is a perspective view of the retainer according a further embodiment of the present invention;

FIG. 25 is a perspective view of the retainer according a further embodiment of the present invention;

FIG. 26 is a perspective view of the retainer according to a further embodiment of the present invention; and FIG. 27 is a perspective view of a conventional retainer.

PREFERRED EMBODIMENTS OF THE INVENTION

Now referring to FIGS. 1 to 26, an explanation will be given of embodiments of the present invention.

A one way clutch 40 (FIGS. 8, 11) is provided with an outer ring 41, an inner ring 42, sprags 43 intervening between the outer ring 41 and the inner ring 42, a retainer 50 receiving the sprags 43 between the outer ring 41 and the inner ring 42, and a ring-shaped coil spring pushing the retainer 50 from outside toward the inner ring in a radial direction of the retainer.

The outer ring 41 and inner ring 42 are designed to rotate integrally to the driving shaft and the driven shaft.

At the end 44 of the outer ring 41, a spot facing hole 45 coaxial with the outer ring 41 is formed.

As shown in FIGS. 1 to 17, the one way retainer 50 includes a short cylindrical structural body 52 (FIG. 2), flanges 53 protruding radially at the one end of the structural body 52, reinforcement pieces 57 protruding radially at the other end 60 of the structural body 52, elasticity imparting grooves 54 cut from the one end 59 toward the reinforcement pieces 57, and sprag receiving grooves 55 cut from the other end 60 of the structural body 52 toward the flanges 53 so as to receive sprags 43.

The elasticity imparting grooves 54 and the sprag receiving grooves 55 are formed in an axial direction and also alternately in a circumferential direction of the structural body 52.

The flanges 53 (see FIGS. 2 and 4) have radial grooves 56 successive to the sprag receiving grooves 55, respectively.

At both ends of the structural body 52, remaining portions 81 at areas corresponding to the elasticity imparting grooves 54 and other remaining portions 80 at the sprag receiving grooves 55 and the radial grooves 56 are formed alternately.

The retainer 50 is an integral molded structural body made of elastic material such as synthetic rubber and resin (plastic). Therefore, in the present invention "cutting" does not mean literally "cut" but "molded in a shape as if it were cut".

Each flange 53 is formed with a stepped distal end, with a first flange end face optionally including a protrusion 58 and a second flange end face forming a step 48 (FIGS. 2, 4, 5, 6, 7, 10, 11, 12, 13, 15, 17, 18, 19, 20, 22, 23, 24, 25, and 26).

At the top of each flange 53 (FIG. 1), a protrusion 58 may be formed to elastically contact with the inner periphery 46 of the spot facing hole 45 of the outer ring 41 (FIG. 11). Alternatively, the flange 53 may be configured without a protrusion 58, as shown by flange 953 (FIG. 26).

The outer periphery of the sprag 43 (FIG. 14) in contact with the outer ring 41 and inner ring 42 has an arc face 61 having a substantially real circle shape falling in the sprag receiving groove 55 and triangular faces 62, 62 in contact with the inner periphery of the outer ring 41.

The sprag 43 has a spring engagement groove 63 with which a ring-shaped coil spring 51 (FIG. 13) is engaged. The one end of the spring engagement groove 63 has a chamfer 64.

An explanation will be given of one example of the process of assembling the one way clutch according to the present invention.

First, an explanation will be given of the process of mounting the sprag 43 into the sprag receiving groove 55 (FIGS. 15 to 17).

The sprag 43 is inserted into the sprag receiving groove 55 against the coil spring 51 from inside of the retainer 50 in which the coil spring 51 is previously mounted. In this case, the sprag 43 is inserted into the sprag receiving groove 55 with the bottom 65 of the spring engagement groove 55 inclined in a radial direction of the retainer 50. The coil spring 51 is brought into contact with the one end of the spring engagement groove 63.

With the sprag 43 supported by tool A or a finger tip, the sprag 43 is pushed up as shown in FIG. 16.

Because the coil spring 51 is in contact with the one end of the inclined bottom 65, the sprag 43 is pushed by the spring 51 to be rotated in the direction of an arrow B. As a result, the sprag is received in the sprag receiving groove 55 as shown in FIG. 17.

Likewise, the sprags 43 are mounted in all of the sprag receiving grooves 55.

All the sprags 43 mounted in the sprag receiving grooves 55 are prevented from being slipped off in both axial and radial directions of the retainer by the coil spring 51. The flange 53 receives the sprag 43 to suppress it from shifting in one sense of the axial direction.

The coil spring 51 is suppressed from being shifted in the axial direction of the retainer 50 by the flange 53 and the reinforcement piece 57.

The retainer 50 with the sprags 43 mounted therein is dealt with as if it is a single component when built into a machine.

The retainer 50 in which the sprags 43 are mounted into all the sprag receiving grooves 55 is inserted between the inner ring 42 and outer ring 41 as shown in FIGS. 8 and 11.

The retainer 50 is likely to warp to have elasticity because of the presence of the remaining portions 80, 81 formed alternately at both ends of the structural body 52. Thus, the retainer 50 with the sprags 43 held can be easily mounted in the inner periphery of the outer ring 41 or the outer periphery of the inner ring 42.

When the retainer 50 (FIG. 11) is inserted between the inner ring 42 and outer ring 41, the step 48 formed on the flange 53 is fit in the inner periphery 49 of the outer ring 41 so that a side of the portion of the flange 53 beyond the step 48 is in contact with the spot facing plane 47. The protrusion 58 of the flange 53 also abuts on the inner periphery 46 of the spot facing hole 45. Thus, the position of the retainer 50 in both axial and radial directions is restricted.

One of the inner ring 42 and outer ring 41 is coupled with the driving shaft whereas the other thereof is coupled with the driven shaft. The sprags 43 intervening between the inner ring 42 and the outer ring 41 transmits the rotational force in accordance with the rotational direction of the driving shaft.

The flanges 53 are formed at the positions corresponding to the conventional remaining portions 33 (FIG. 27). Since the flanges 53 are formed radially, they can have a larger diameter than those of the conventional remaining portions 33. Therefore, assuming that the flanges 53 and the conventional remaining portions 33 have an equal strength, the thickness (T2) of the flanges 53 can be made smaller than that (T1) of the conventional remaining portions 33.

Correspondingly, the length of the retainer 50 can be made shorter than that of the conventional retainer 50.

If the thickness (T2) of the flange 53 is made equal to that (T1) of the conventional remaining portion 33, the flange 53 can prevent the strength of the retainer 50 from being reduced owing to the provision of the sprag receiving groove 55 in the structural body 52.

What mainly imparts elasticity to the retainer 50 is a remaining portion 81 corresponding to the elasticity imparting groove 54. The size of this remaining portion can be freely set by changing the size of the elasticity imparting groove. The other remaining portion 80 also imparts elasticity to the retainer 50 to a certain degree.

Figure 2:
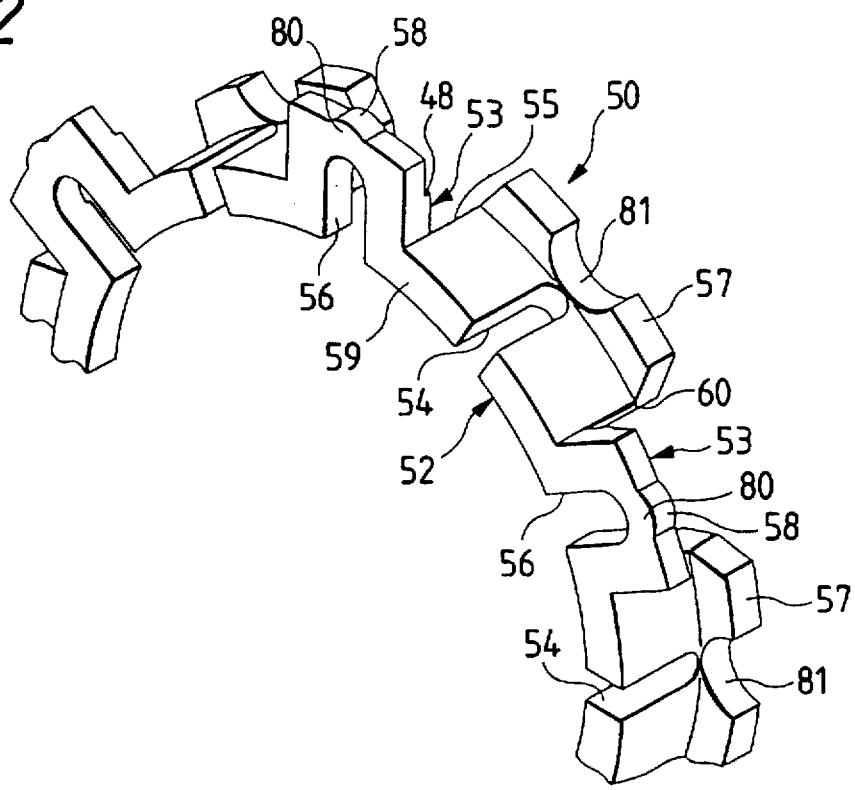
FIG. 2 is a perspective view of the retainer of FIG. 1.
Figure 4:
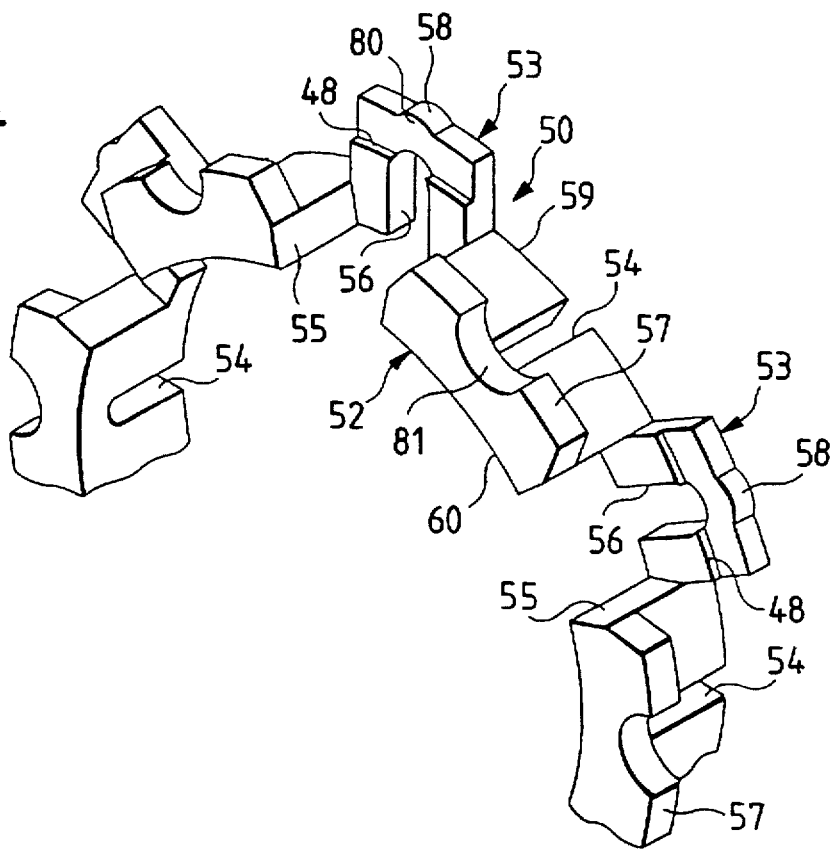
FIG. 4 is a perspective view of FIG. 3.
Figure 3:
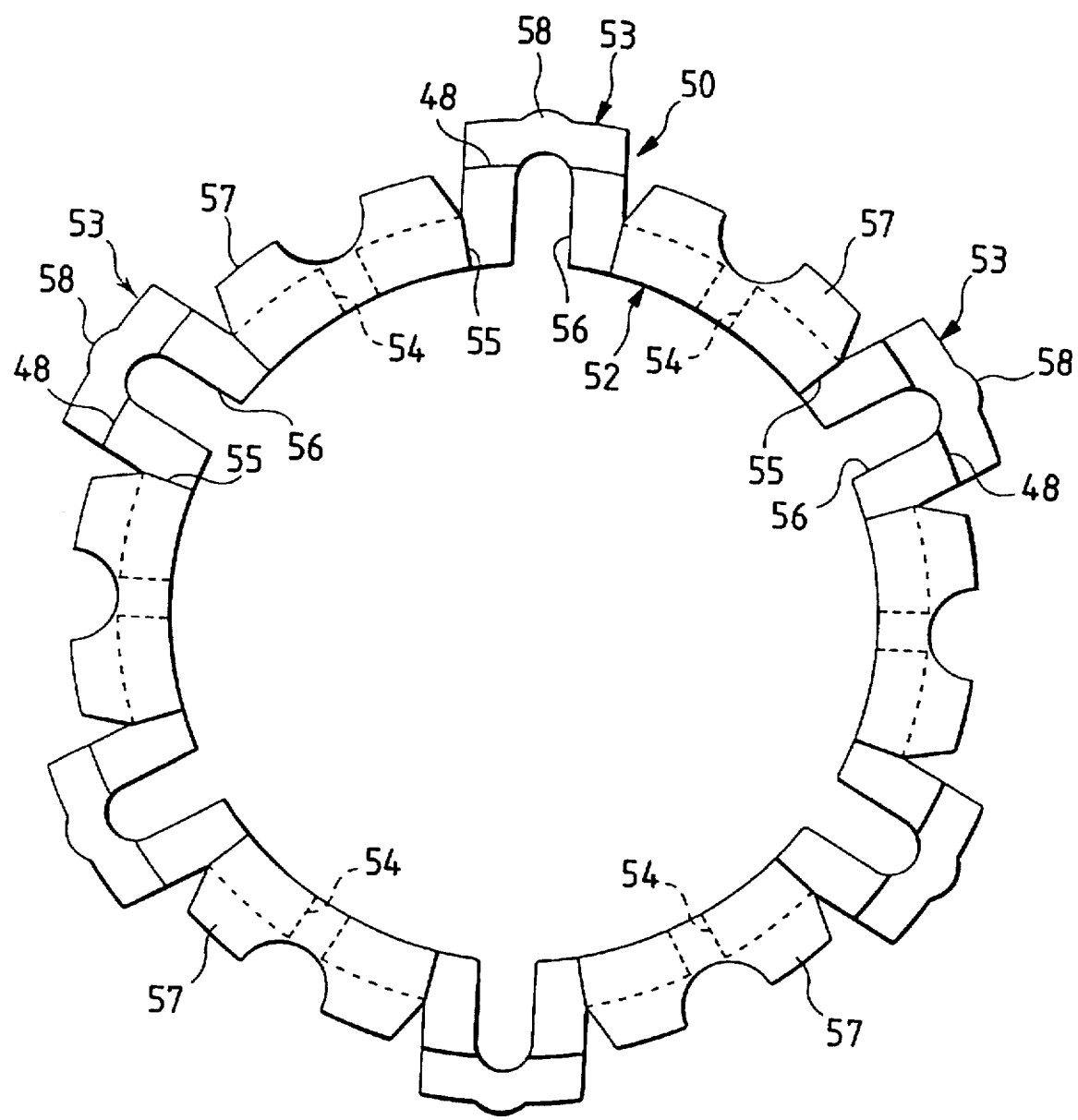
FIG. 3 is a rear view of FIG. 1.
Figure 5:
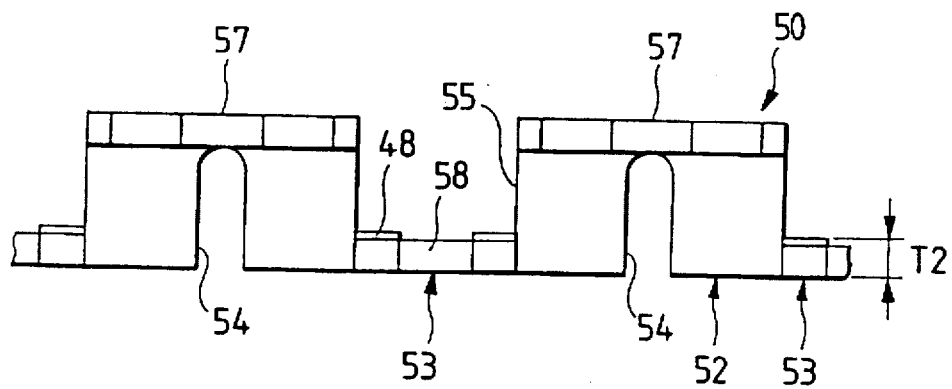
FIG. 5 is a plan view of FIG. 1.
Figure 6:
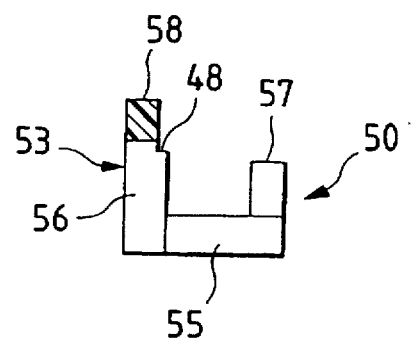
FIG. 6 is a sectional view taken on line 6—6 of FIG. 1.
Figure 7:
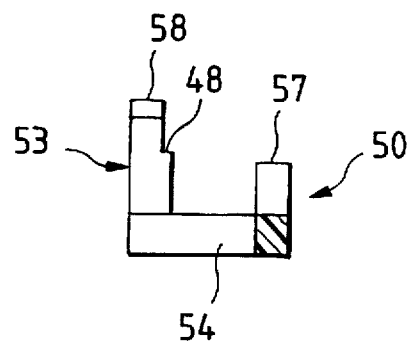
FIG. 7 is a sectional view taken on line 7—7 of FIG. 1.

The retainer 50 has larger elasticity than the conventional retainer because of the presence of these remaining portions 80 and 81 (see FIGS. 2 and 4).

For this reason, even when the sprag slips because of excess load and the resultant shock is given to the retainer, the retainer is difficult to crack. Thus, the one way clutch 40 can effect a smooth operation for a long time.

Now referring to FIGS. 18 to 26, an explanation will be given of other embodiments of the retainer according to the present invention. A retainer 150 shown in FIG. 18 intends to increase its rigidity by making the width W of the radial groove 156 smaller than that of the radial groove of the retainer 50 shown in FIGS. 1 to 17 (hereinafter referred to as the retainer of FIG. 1) so that the area of the flange 153 in the circumferential direction is increased.

Figure 1:
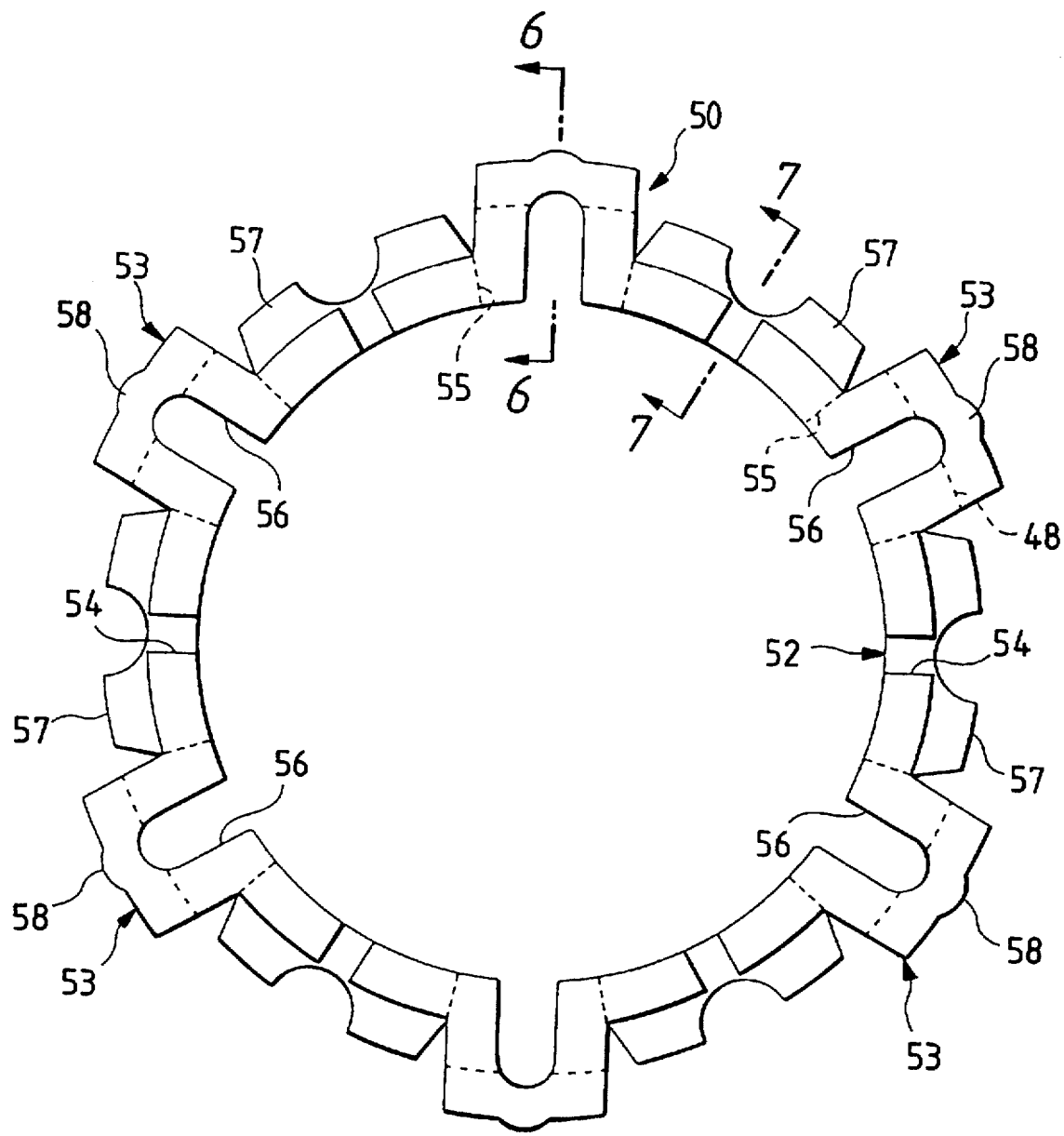
FIG. 1 is a front view of a retainer of the one way clutch according to the first embodiment of the present invention.

The retainer 250 of FIG. 19 intends to make the its elasticity larger than that of the retainer 50 of FIG. 1 by making the width W2 of the radial groove 256 larger than that of that of the radial groove 56 of the retainer 50 of FIG. 1.

A retainer 350 shown in FIG. 20 intends to make the its elasticity larger than that of the retainer 50 of FIG. 1 by making the width W3 of the radial groove 356 larger than that of that of the radial groove 56 of the retainer 50 of FIG. 1. Further, the retainer 350 of FIG. 20 intends to enhance the strength of a reinforcement 357 by making its circumferential length L4 longer than that of the reinforcement piece 57 of FIG. 1.

A retainer 450 shown in FIG. 21 intends to enhance the strength of a reinforcement piece 457 by causing its both ends upright in the radial direction to make its circumferential length L5 longer than that of the reinforcement piece 57 of the retainer 50 of FIG. 1.

A retainer 550 shown in FIG. 22 intends to effect easy reception of the sprag 43 by making both circumferential ends 570 slant.

A retainer 650 shown in FIG. 23 intend to receive the sprag shifting in one sense of the axial direction surely by making the width W6 of a radial groove 656 smaller than that of the radial groove 56 of the retainer 50 of FIG. 1 to increase the circumferential area of a flange 653.

The retainer 650 of FIG. 23 intends to enhance the rigidity of a reinforcement piece 657 by making its circumferential length L7 longer than the reinforcement piece 57 of the retainer 50 of FIG. 1.

A retainer 750 shown in FIG. 24 intends to enhance its rigidity by increasing the circumferential area of the flange due to the absence of the radial groove in the flange.

The retainer 750 of FIG. 24 also intends to enhance the strength of a reinforcement piece 757 by making it circumferential length L8 longer than that of the reinforcement 57 of the retainer of FIG. 1.

Further, the flange 753 of the retainer of FIG. 24 has an elasticity imparting hole 770 imparting elasticity to a protrusion 758 so that it is elastically connected to the inner periphery of the spot facing hole of the outer ring.

Although the elasticity imparting grooves 54, 154, 254, 354, 454, 554, 654, 754 in FIGS. 1 to 24 are provided only once between the sprag receiving grooves 55, 155, 255, 355, 455, 555, 655, 755, a plurality of elasticity imparting grooves may be provided (not shown).

Although each elasticity imparting groove is formed by cutting from the side where the flange is formed, one or plural elasticity imparting grooves may be formed so as to be cut from the side where the reinforcement piece is formed (not shown).

Further, like elasticity imparting grooves 854 of the retainer 850 of FIG. 25 described later, plural elasticity imparting grooves may be formed alternately from both ends of the structural body 852 (not shown).

The retainer 850 of FIG. 25 has no radial groove in the flange 853, but has three elasticity imparting grooves 854 cut alternately from both ends of the structural body 852 between the sprag receiving grooves 855 to prevent reduction in elasticity due to the absence of the radial groove.

The width W9 of the elasticity imparting groove is designed to be slightly smaller than that of the elasticity imparting groove 54 of the retainer 50 of FIG. 1.

In order that the three elasticity imparting grooves 854 can impart elasticity to the structural body 852, it is preferred that the sprag receiving grooves 855 and the plural elasticity imparting grooves 854 are alternately cut from both ends of the structural body 852 so that remaining portions 881, 881, 881 are formed on both sides of the structural body 852.

The retainer 850 of FIG. 25 also intends to enhance the strength of a reinforcement 857 by making its circumferential length L10 longer than that of the reinforcement piece 57 of FIG. 1.

Further, the flange 853 of the retainer of FIG. 24 has an elasticity imparting hole 870 imparting elasticity to a protrusion 858 so that it is elastically connected to the inner periphery of the spot facing hole of the outer ring.

Incidentally, although each of the elasticity imparting grooves 54, 154, 254, 354, 454, 554, 654, 754 and 854 is a groove penetrating between the inner and outer periphery of the structural body 52, 152, 252, 252, 452, 552, 652, 752, 852, three elasticity imparting grooves 954 of the retainer 950 of FIG. 26 are pail-shaped grooves formed in the entire axial length of the structural body 952.

The elasticity imparting grooves 954 adjacent to the flange 953 are formed on the outer periphery of the structural body 952 whereas the remaining elasticity imparting grooves 954 are formed on the inner periphery 952.

The inner periphery of the retainer 950 of FIG. 26 has remaining portions 981, 981 formed alternately formed on the inner and outer peripheries of the structural body 952, whereas the reinforcement piece has also the remaining portion 981.

The retainer 950 has larger elasticity than the conventional retainer because of the presence of the remaining portions 981.

A single elasticity imparting groove 954 may be provided on the inner or outer periphery of the structural body 952 between the sprag receiving grooves 955, 955. Otherwise, plural elasticity imparting grooves 954 may be provided on only the inner periphery or the outer periphery.

The retainer 950 of FIG. 26 intends to enhance the strength of a reinforcement piece 957 by making its circumferential length L11 longer than that of the reinforcement piece 50 of FIG. 1.

In the retainer shown in each of FIGS. 1 to 26, the plural sprag receiving grooves and plural elasticity imparting grooves are provided. However, a single sprag receiving groove and an elasticity imparting groove may be provided (not shown).

For this reason, even when the sprag slips because of excess load and the resultant shock is given to the retainer, the retainer is difficult to crack. Thus, the one way clutch according to the present invention can effect a smooth operation for a long time.

The one way clutch according to the present invention, which has a flange which radially protrudes from the one end of the structural body so that its both sides abut on the end face of said structural body, can have the following effects.

(1) Reduction in the strength of the retainer due to the provision of the sprag receiving groove in the retainer can be prevented, thus assuring the smooth operation of the one way clutch for a long time.

(2) The length of the retainer can be reduced by a difference between the wall thickness of the remaining portion of the conventional retainer and thickness of the flange in the present invention, thus miniaturizing the one way clutch.

(3) Holding the retainer in the outer ring assures engagement of the clutch, thus permitting the operation of the clutch for a long time.

The one way clutch according to the present invention, which includes a retainer having larger elasticity than that of the conventional retainer owing to the presence of the elasticity imparting groove, can have the following effects.

(4) Even when excess shock or load is applied to the retainer, the retainer is resistant to damage such as cracking and hence is difficult to impair the clutching function, thus assuring the smooth operation for a long time.

(5) The retainer can be easily incorporated into the inner ring or outer ring, thus enhancing the production efficiency of the one way clutch.

The plurality of said elasticity imparting grooves cut alternately in an axial direction from the one end and other end of said structural body, as in the one way clutch according to the present invention enhances the elasticity of the retainer to prevent damage such as cracking of the retainer, thus permitting the smooth operation of the one way clutch for a long time.

The plurality of pail-shaped grooves formed alternately in an axial direction of the inner periphery and outer periphery of said structural body, as in the one way clutch according to the present invention can enhance the elasticity of the retainer.

Provision of a radial groove formed in an radial direction so as to communicate with said sprag receiving groove in the flange, as in the one way clutch according to the present invention can enhance the elasticity of the retainer to prevent damage such as cracking, thus permitting the smooth operation of the one way clutch.

The retainer made of elastic substance such as synthetic resin and plastic, as in the one way clutch according to the present invention, permits lightweight one way clutches to be produced at high production efficiency.

What is claimed is:

1. A one way clutch comprising:
   an inner ring;
   an outer ring having a spot facing hole;
   a sprag intervening between said outer ring and said inner ring; and
   a retainer for receiving said sprag;
   wherein said retainer comprises:
   a cylindrical structural body;
   a flange radially protruding from one end of said structural body, and having a stepped distal end forming a first flange end face and a second flange end face, wherein said first flange end face abuts an inner periphery of said spot facing hole and said second flange end face abuts an inner periphery of said outer ring;
   a sprag receiving groove formed toward said flange for receiving said sprag; and
   an elasticity imparting groove formed in an axial direction of said structural body.

2. A one way clutch according to claim 1, wherein a plurality of said sprag receiving grooves are formed and said elasticity imparting groove is formed between said sprag receiving grooves.

3. A one way clutch according to claim 1, wherein said elasticity imparting groove is formed beginning from at least one end of said structural body.

4. A one way clutch according to claim 1, wherein said elasticity imparting groove is oriented in an axial direction along an entire axial length of the inner periphery of said structural body.

5. A one way clutch according to claim 3, wherein a plurality of said elasticity imparting grooves are formed beginning from at least one of one end of said structural body.

6. A one way clutch according to claim 1, wherein said elasticity imparting groove comprises a plurality of grooves formed alternately in an axial direction along an entire axial length of the inner periphery and outer periphery of said structural body.

7. A one way clutch according to claim 1, wherein said flange of said retainer has a radial groove formed in a radial direction to communicate with said sprag receiving groove.

8. A one way clutch according to claim 1, wherein said retainer is made of elastic substance.

9. A one way clutch according to claim 8, wherein said elastic substance is at least one of synthetic resin and plastic.

10. A one way clutch according to claim 1, wherein said elasticity imparting groove is oriented in an axial direction along an entire axial length of the outer periphery of said structural body.

11. A one way clutch according to claim 1, wherein said flange of said retainer has an elasticity imparting hole.

12. A one way clutch according to claim 1, wherein said flange of said retainer has a protrusion formed on said first flange end face.

13. A one way clutch comprising:
   an inner ring;
   an outer ring having a spot facing hole;
   a sprag intervening between said outer ring and said inner ring; and a retainer for receiving said sprag;
   wherein said retainer comprises:

a cylindrical structural body;

a stepped flange which radially protrudes from one end of the structural body so that said stepped flange contacts said spot facing hole and an inner periphery of the outer ring;

a sprag receiving groove formed toward said stepped flange for receiving said sprag; and an elasticity imparting groove formed in an axial direction of said structural body.

14. A one way clutch according to claim 13, wherein a plurality of said sprag receiving grooves are formed and said elasticity imparting groove is formed between said sprag receiving grooves.

15. A one way clutch according to claim 13, wherein said elasticity imparting groove is formed beginning from at least one end of said structural body.

16. A one way clutch according to claim 13, wherein said elasticity imparting groove is oriented in an axial direction along an entire axial length of the inner periphery of said structural body.

17. A one way clutch according to claim 13, wherein said elasticity imparting groove is oriented in an axial direction along an entire axial length of the outer periphery of said structural body.

18. A one way clutch according to claim 15, wherein a plurality of said elasticity imparting grooves are formed beginning from at least one end of said structural body.

19. A one way clutch according to claim 13, wherein said elasticity imparting groove comprises a plurality of grooves formed alternately in an axial direction along an entire axial length of the inner periphery and outer periphery of said structural body.

20. A one way clutch according to claim 13, wherein said flange of said retainer has a radial groove formed in a radial direction to communicate with said sprag receiving groove.

21. A one way clutch according to claim 13, wherein said retainer is made of elastic substance.

22. A one way clutch according to claim 21, wherein said elastic substance is at least one of synthetic resin and plastic.

23. A one way clutch according to claim 13, wherein said flange of said retainer has an elasticity imparting hole.

24. A one way clutch according to claim 13, wherein said flange of said retainer has a protrusion formed on said first flange end face.

* * * * *